United States Patent [19]

Ferholz et al.

[11] 3,865,872
[45] Feb. 11, 1975

[54] PROCESS FOR THE MANUFACTURE OF SORBIC ACID

[75] Inventors: Hans Ferholz, Fischbach/Taunus; Hans-Joachim Schmidt, Falkenstein/Taunus; Friedrich Wunder, Florsheim/Main, all of Germany

[73] Assignee: Hoechst Aktiengesellschaft, Frankfurt Main, Germany

[22] Filed: Jan. 24, 1973

[21] Appl. No.: 326,385

[30] Foreign Application Priority Data
Jan. 27, 1972 Germany............................ 2203712
Apr. 12, 1972 Germany............................ 2217529

[52] U.S. Cl............................................. 260/526 N
[51] Int. Cl.............................................. C07c 51/00
[58] Field of Search................................. 260/526 N

[56] References Cited
UNITED STATES PATENTS
2,484,067  11/1949  Baese.................................. 260/526
2,739,158  8/1953   Caldwell............................. 260/526

Primary Examiner—Vivian Garner
Attorney, Agent, or Firm—Curtis, Morris & Safford

[57] ABSTRACT

Sorbic acid is prepared by splitting the ketene/crotonic aldehyde polyester in the presence of a macroreticulated exchange resin having a pore diameter of at least 200 A on the average and a water content of less than 20 percent by weight. The process can be carried out discontinuously or continuously with a good yield, the sorbic acid obtained having a high quality.

11 Claims, No Drawings

PROCESS FOR THE MANUFACTURE OF SORBIC ACID

The present invention relates to a process for the manufacture of sorbic acid from ketene and crotonic aldehyde.

It has been proposed to convert into sorbic acid the polyester obtained by reacting ketene and crotonic aldehyde by heating with a strong acid or a strong base, by alkaline and subsequent acid treatment and thermolysis preferably catalyzed by a basic catalyst. Suitable acids for the acid splitting are hydrochloric acid, sulfuric acid, phosphoric acid, p-toluene-sulfonic acid, or benzene-sulfonic acid.

It is known that the acid conversion of the polyester can be performed in water as well as in an organic solvent, preferably acetic acid or xylene. Optimum results are obtained with an at least 20.2 percent aqueous hydrochloric acid or with perchloric acid. The reason therefor is that both acids bring about not only the splitting of the polyester, but also the isomerization of the cis-isomeric hexadienoic acids, normally occuring as byproducts, to yield sorbic acid. The substantial disadvantage of the splitting of the polyester by heating with a strong acid resides in the formation of black-brown by-products rendering impossible a repeated use of the acid reaction solution after separation of sorbic acid. Moreover, the separated sorbic acid contains residual strong acid which must be carefully washed out whereby large amounts of acid-containing waste water are obtained. If hydrochloric acid is used in an industrial process the danger exists that parts of the plant are destroyed by corrosion.

The present invention provides a process for the manufacture of sorbic acid from ketene and crotonic aldehyde by splitting the polyester thereof, prepared in known manner, which comprises carrying out the splitting in the presence of an acid macro-reticulated exchange resin having a pore diameter of at least 200 Å on the average, preferably 200 to 1,300 Å, and a water content of less than 20 percent by weight, preferably less than 10 percent by weight.

This result is very surprising since:

1. strongly acid macro-reticulated exchange resins having a higher water content, for example a sulfonated polystyrene resin in the $H^+$- form having a pore diameter of 400 to 1,200 Å and a water content of 45 to 80 percent by weight, are practically ineffective;
2. hitherto an optimum effect has been obtained with aqueous hydrochloric acid; and
3. the efficiency of the exchange resin to be used according to the present invention is much higher than that of a strong acid, for example under comparative conditions it is practically twice as high as the efficiency of the chemically closely related p-toluene-sulfonic acid. A further advantage resides in the fact that the formation of blackish-brown by-products mentioned above is avoided when the exchange resin according to the invention is used.

As acid macro-reticulated exchange resin there is especially suitable a sulfonated polystyrene resin in the $H^+$-form having a specific surface of over 5 $m^2/g$, preferably 15 to 150 $m^2/g$.

The exchange resin to be used according to the invention can be added, especially in the case of a discontinuous reaction, directly to the polyester solution. In a continuous process the exchange resin is suitably placed in a reaction tube or chamber. To carry out the process of the invention the polyester is preferably used in the form of a solution in an inert organic solvent which is suitable for acid splitting and in which the exchange resin is practically insoluble. There can be used hydrocarbons, carboxylic acids, ethers, halogenated hydrocarbons, and ketones. Organic solvents soluble in water or miscible with water are preferred so that the separated sorbic acid can be washed out with water. The selection of the solvent essentially depends on the method of purification. When the sorbic acid is purified by recrystallization it is advantageous to use, for example, acetic acid, propionic acid, or dioxane. When, however, the sorbic acid is purified by entrainer distillation a compound should be used as entrainer and solvent which can be distilled without decomposition at reduced or atmospheric pressure, is inert towards sorbic acid and has a boiling point of from 180° to 300°C, preferably 210° to 270°C at atmospheric pressure. Entrainers of this type are, for example, aliphatic, cycloaliphatic, or aromatic hydrocarbons, such as petroleum fractions, dodecane, tetradecane, 5-methyldodecane, dodecene, dicyclohexyl, dicylohexyl methane, p-di-(tert-butyl)-benzene, tetrahydronaphthalene, 1- and 2-methylnaphthalene, 1-ethylnaphthalene, diphenyl, naphthalene; halogenated aliphatic, cycloaliphatic, or aromatic hydrocarbons, such as dichloro-dodecane, 1,5-dibromopentane, benzotrichloride, o- and m-dibromobenzene; nitrocompounds, for example nitrobenzene, 2-nitrotoluene; nitriles such as benzyl cyanide; carbonyl compounds, for example acetophenone, dihydrocarvone, or the heterocyclic 2-acetylthiophene; heterocyclic compounds such as chroman and thiophthene; ethers, for example resorcinol dimethyl ether, diphenyl ether, safrole, isosafrole; acids such as n-heptanoic acid, $\alpha$-ethylcaproic acid, caprylic acid, capric acid; esters, for example succinic acid diethyl ester, glutaric acid diethyl ester, benzoic acid ethyl ester, phenyl acetic acid methyl ester and salicylic acid methyl ester. A polyglycol ether mixture having a content of over 50 percent of triethylene glycol diethyl ether is preferably used as solvent.

The concentration of the polyester solution may vary within wide limits. It is expedient to choose as high a polyester concentration as possible. Especially in the case of a continuous operation the solubility of sorbic acid in the organic solvent used at the reaction temperature applied has to be taken into consideration in order to prevent the reactor from clogging by the formation of crystalline sorbic acid.

The upper limit of the reaction temperature is defined by the highest working temperature allowed for the exchange resin used. With commercial ion exchangers this temperature is about 120°C. The temperatures used for splitting the polyester according to the process of the invention can vary within wide limits, in general splitting is performed at a temperature in the range of from 20° to 120°C, preferably 50° to 105°C.

As compared with the basically catalyzed thermolysis the process of the invention has the advantage of a much lower reaction temperature, that costs for a catalyst are saved and, especially in the case of continuous working with entrainer distillation no cis-isomeric hexadienoic acids accumulate and hence, losses in yield of sorbic acid and entrainer are avoided.

When the process is carried out continuously with circulation of the mother liquor obtained after separation of the crystallized sorbic acid the catalytic efficiency of the exchange resin may diminish after some time, which may be attributed, at least partially, to impurities in the polyester. In order to avoid this drop in activity of the exchange resin it is expedient to add, to the solution of the polyester, catalytic amounts of a strong acid, such as sulfuric acid, hydrochloric acid, perchloric acid, benzenesulfonic acid, or toluenesulfonic acid. By catalytic amounts there are understood amounts in the range of from 0.05 to 2.5 percent by weight, preferably 0.25 to 1.5 percent by weight, calculated on the weight of the polyester solution.

The following examples illustrate the invention, the percentages being percent by weight unless otherwise stated.

EXAMPLE 1

A macro-reticulated polystyrene resin having sulfonic acid groups in $H^+$ form, a pore diameter of from 200 to 600 A, a specific surface of about 50 $m^2/g$, a particle diameter of from 0.3 to 1.2 mm and a water content of about 10 percent was used. 50 grams of the specified resin were added to a solution of 100 grams of ketene/crotonic aldehyde polyester, containing 1 percent of zinc salts of fatty acids, 2 percent of toluene, 1,5 percent of water and other by-products originating from the manufacturing process, in 200 grams of glacial acetic acid and the mixture was stirred for 30 minutes at 100°C. The reaction mixture was filtered while still hot and the separated resin was washed with 50 grams of glacial acetic acid. When the filtrate was cooled 75.3 grams of crude sorbic acid having a strength of 99.5 percent crystallized out. By diluting the mother liquor with water 20.4 grams of a product were obtained having a sorbic acid content of 92.3 percent. The total yield of sorbic acid was thus 95 percent, calculated on the pure polyester used.

EXAMPLE 2

(Comparative example)

A sulfonated macro-reticulated polyester resin in $H^+$ form having a pore radius of 400 to 1,200 A and a water content of about 50 percent was used. 50 grams of the resin were allowed to act on the polyester under the conditions specified in Example 1. After filtration of the hot reaction mixture no crystals of sorbic acid separated.

EXAMPLE 3

(Comparative example)

30 grams of p-toluenesulfonic acid were added to a solution of 100 grams of the polyester described in Example 1 in 200 grams of glacial acetic acid and the mixture was stirred for 30 minutes at 100°C. When the blackish brown solution was cooled 41 grams of a dark grey crude acid crystallized out having a content of sorbic acid of 93.2 percent. By dilution of the mother liquor with water a further 8 grams of a 88.7 percent crude acid were obtained. The total yield of sorbic acid was 48 percent, calculated on the polyester used.

When under otherwise identical conditions 60 or 90 grams of p-toluenesulfonic acid were used, the yield of sorbic acid was slightly reduced to 47 percent. The crude sorbic acid obtained had a blackish brown color.

EXAMPLE 4

The reaction was carried out under the conditions specified in Example 1 with the exception that instead of 200 grams of acetic acid the same amount of dioxane was used. For working up the separated resin was washed with 50 grams of hot dioxane. The total yield of sorbic acid amounted to 94.2 percent, calculated on the polyester used.

EXAMPLE 5

In a flask with stirrer 50 grams of the polystyrene resin described in Example 1 and 300 grams of a solution of 1 part by weight of ketene/crotonic aldehyde polyester having the composition defined in Example 1 and 2 parts by weight of toluene were stirred for 40 minutes at 100°–105°C. The mixture was filtered while hot and the filtrate was cooled. After separation and drying 87.5 grams of sorbic acid of 99.8 percent strength were obtained. The separated polystyrene resin and the mother liquor obtained were used for a second batch.

In this reaction 91.8 grams of sorbic acid of 99.9 percent strength were obtained, corresponding to a yield of 96 percent, calculated on the polyester used. In a third and fourth batch using the same polystyrene resin and the mother liquor of the previous batch yields of 95.5 and 96 percent were obtained.

EXAMPLE 6

2 Liters of a macro-reticulated polystyrene/divinyl benzene resin having sulfonic acid groups in $H^+$ form, a pore diameter of 200 to 1,300 A, a specific surface of about 60 $m^2$ per gram, a particle diameter of 0.3 to 1.2 mm and a moisture content of 1.2 percent were introduced into a jacketed reaction tube having a diameter of 40 mm and a length of 2 m, which tube was heated at 100°–105°C with steam. Below the resin layer a preheating zone was provided which was likewise heated at 100°C and into which 3 kilograms of a solution of 1 part by weight of ketene/crotonic aldehyde polyester of the composition specified in Example 1 in 2 parts by weight of triethylene glycol diethyl ether were metered in per hour. After having passed the reaction tube the reaction product withdrawn at the upper end of the tube was introduced continuously into the center section of a distilling column and distilled under a pressure of about 20 mm of mercury. The distillate was cooled and the crystalline sorbic acid formed was separated periodically. 1 Kilogram per hour of the mother liquor obtained was metered into the lower part of the distilling column as additional entrainer, the remainder was used for preparing fresh starting mixture.

After having obtained constant conditions 915 to 935 grams of colorless pure sorbic acid were obtained from the distillate, corresponding to a yield of 96–98 percent, calculated on the polyester used. After 300 hours yield and quality of the sorbic acid obtained were still unchanged.

EXAMPLE 7

(Comparative example)

2 Liters of a macro-reticulated polystyrene/divinyl benzene resin with sulfonic acid groups in $H^+$ form, having a pore diameter of 200 to 1,300 A, a specific surface of about 60 $m^2$ per gram, a particle diameter of 0.3 to 1.2 mm and a water content of 1.2 percent were introduced into a jacketed reaction tube heated at 100 to 105°C with steam and having a length of 2 m and a diameter of 40 mm. Below the resin layer a preheating zone was provided which was likewise heated at 100°C. 3 Kilograms per hour of a solution of 1 part by weight of ketene/crotonic aldehyde polyester having an ester content of 90 percent, determined by the ester number, and 2 parts by weight of triethylene glycol diethyl ether were metered into the preheating zone. After having passed the reaction zone the reaction solution was cooled to about 15°C and the crystalline sorbic acid formed filtered off periodically. 925 to 935 grams of sorbic acid of 94–95 percent strength were obtained per hour, corresponding to a yield of sorbic acid of 100 percent strength of 97 to 98 percent. After having replaced the portion of polyglycol ether remaining in the sorbic acid (about 50 grams per hour) the mother liquor was used for preparing fresh starting mixture. After a time of operation of 350 hours 860 grams of sorbic acid were obtained per hour on the average. After 420 hours the yield of sorbic acid had dropped to 680 grams per hour.

EXAMPLE 8

The reaction was carried out as described in Example 7 with the exception that 0.6 percent of concentrated hydrochloric acid was added to the polyester solution. After a time of operation of 920 hours about 930 grams of a 94 to 95 percent sorbic acid were obtained per hour on the average. A drop in activity of the exchange resin could not be observed.

EXAMPLE 9

The reaction was carried out as described in Examples 7 and 8 with the exception that the 2 parts by weight of triethylene glycol diethyl ether were replaced by 2 parts by weight of glacial acetic acid as solvent and that 0.5 percent of concentrated sulfuric acid was added to the polyester solution instead of 0.6 percent of hydrochloric acid. On the average 900 grams of sorbic acid having a strength of approximately 98 percent were obtained per hour. A drop in activity was not observed after over 1,000 hours.

What we claim is:

1. A process for the manufacture of sorbic acid from ketene and crotonic aldehyde by splitting a polyester formed therefrom, which comprises splitting the polyester at a temperature in the range of 20°–120°C. in the presence of an acid macro-reticulated exchange resin having an average pore diameter of at least 200 A and a water content of less than 20 percent by weight.

2. The process of claim 1, wherein the exchange resin is a sulfonated polystyrene resin in $H^+$ form having a specific surface of over 5 $m^2$ per gram.

3. The process of claim 2, wherein the sulfonated polystyrene resin in $H^+$ form has a specific surface in the range of from 15 to 150 $m^2$ per gram.

4. The process of claim 1, wherein the splitting is carried out in an inert organic solvent miscible with water.

5. The process of claim 1, wherein the splitting is carried out in an entrainer, the reaction mixture is distilled and the sorbic acid is separated from the distillate, said entrainer being an inert organic solvent having a boiling point of 180°–300°C.

6. The process of claim 5, wherein the splitting is carried out in a reaction mixture containing as an entrainer over 50 percent of triethylene glycol diethyl ether.

7. The process of claim 1 wherein the exchange resin has a mean pore diameter in the range of from 200 to 1,300 A.

8. The process of claim 1, wherein the exchange resin has a water content of less than 10 percent by weight.

9. The process of claim 1, wherein the temperature is in the range of from 50° to 105°C.

10. The process of claim 1, wherein the splitting reaction is carried out with the polyester in solution and 0.05 to 2.5 percent by weight of a strong acid is added to the polyester solution, calculated on the weight of said solution.

11. The process of claim 10, wherein 0.25 to 1.5 percent by weight of a strong acid is added to the polyester solution.

* * * * *